United States Patent
Piry et al.

(10) Patent No.: US 10,394,716 B1
(45) Date of Patent: Aug. 27, 2019

(54) APPARATUS AND METHOD FOR CONTROLLING ALLOCATION OF DATA INTO A CACHE STORAGE

(71) Applicant: Arm Limited, Cambridge (GB)

(72) Inventors: Frederic Claude Marie Piry, Cagnes-sur-Mer (FR); Peter Richard Greenhalgh, Cambridge (GB); Ian Michael Caulfield, Cambridge (GB); Albin Pierrick Tonnerre, Nice (FR); Jeffrey Allen Kehl, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/946,848

(22) Filed: Apr. 6, 2018

(51) Int. Cl.
| | |
|---|---|
| *G06F 12/08* | (2016.01) |
| *G06F 12/0871* | (2016.01) |
| *G06F 12/0808* | (2016.01) |
| *G06F 9/30* | (2018.01) |
| *G06F 9/38* | (2018.01) |
| *G06F 12/14* | (2006.01) |

(52) U.S. Cl.
CPC ...... *G06F 12/0871* (2013.01); *G06F 9/30047* (2013.01); *G06F 9/30058* (2013.01); *G06F 9/3842* (2013.01); *G06F 12/0808* (2013.01); *G06F 12/1441* (2013.01)

(58) Field of Classification Search
None
See application file for complete search history.

(56) References Cited

U.S. PATENT DOCUMENTS

| | | | |
|---|---|---|---|
| 5,606,687 A * | 2/1997 | Mehring | G06F 12/0888 711/118 |
| 7,774,531 B1 | 8/2010 | Karlsson | |
| 2008/0040590 A1* | 2/2008 | Lee | G06F 9/30094 712/238 |
| 2008/0040591 A1* | 2/2008 | Moyer | G06F 9/30058 712/238 |

(Continued)

OTHER PUBLICATIONS

Arm Limited, Whitepaper "Cache Speculation Side-channels" Version 1.2, Feb. 2018, pp. 1-13.

(Continued)

*Primary Examiner* — Kevin Verbrugge
(74) *Attorney, Agent, or Firm* — Nixon & Vanderhye P.C.

(57) ABSTRACT

An apparatus and method are provided for controlling allocation of data into cache storage. The apparatus comprises processing circuitry for executing instructions, and a cache storage for storing data accessed when executing the instructions. Cache control circuitry is arranged, while a sensitive allocation condition is determined to exist, to be responsive to the processing circuitry speculatively executing a memory access instruction that identifies data to be allocated into the cache storage, to allocate the data into the cache storage and to set a conditional allocation flag in association with the data allocated into the cache storage. The cache control circuitry is then responsive to detecting an allocation resolution event, to determine based on the type of the allocation resolution event whether to clear the conditional allocation flag such that the data is thereafter treated as unconditionally allocated, or to cause invalidation of the data in the cache storage. Such an approach can reduce the vulnerability of a cache to speculation-based cache timing side-channel attacks.

19 Claims, 11 Drawing Sheets

(56) References Cited

U.S. PATENT DOCUMENTS

| | | | |
|---|---|---|---|
| 2014/0075125 A1* | 3/2014 | Biswas | G06F 12/08 |
| | | | 711/136 |
| 2016/0179586 A1 | 6/2016 | Wang et al. | |
| 2017/0116118 A1* | 4/2017 | Artieri | G06F 12/084 |
| 2017/0242796 A1 | 8/2017 | Gschwind et al. | |
| 2017/0329627 A1 | 11/2017 | Diestelhorst et al. | |
| 2019/0068374 A1* | 2/2019 | Veeningen | G06F 21/6245 |

OTHER PUBLICATIONS

International Search Report and Written Opinion of the International Searching Authority for PCT/GB2019/050779 dated May 24, 2019, 17 pages.

R. Grisenthwaite, Arm Limited, Whitepaper "Cache Speculation Side-channels" Version 1.1, Jan. 2018, pp. 1-13.

* cited by examiner

FIRST MEMORY ACCESS INSTRUCTION (MAY ABORT)
SECOND MEMORY ACCESS INSTRUCTION (EXECUTED SPECULATIVELY BUT NOT TO BE EXECUTED IF FIRST MEMORY ACCESS ABORTS)
FIG. 10A
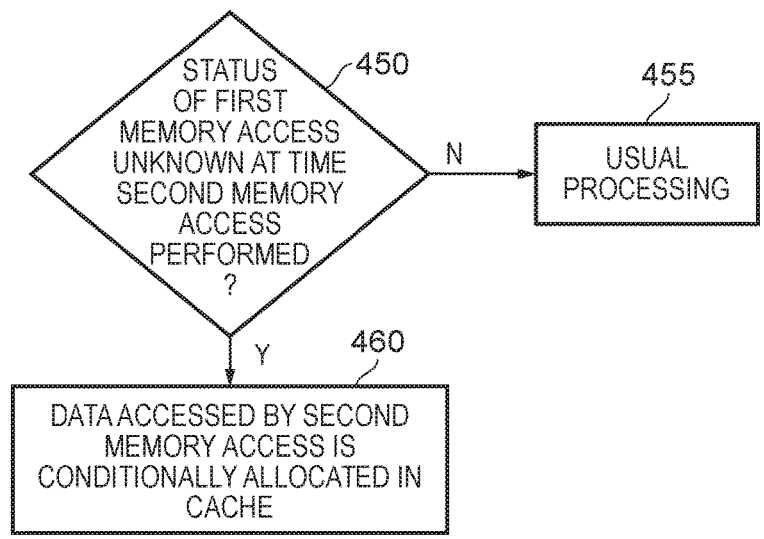
FIG. 10B
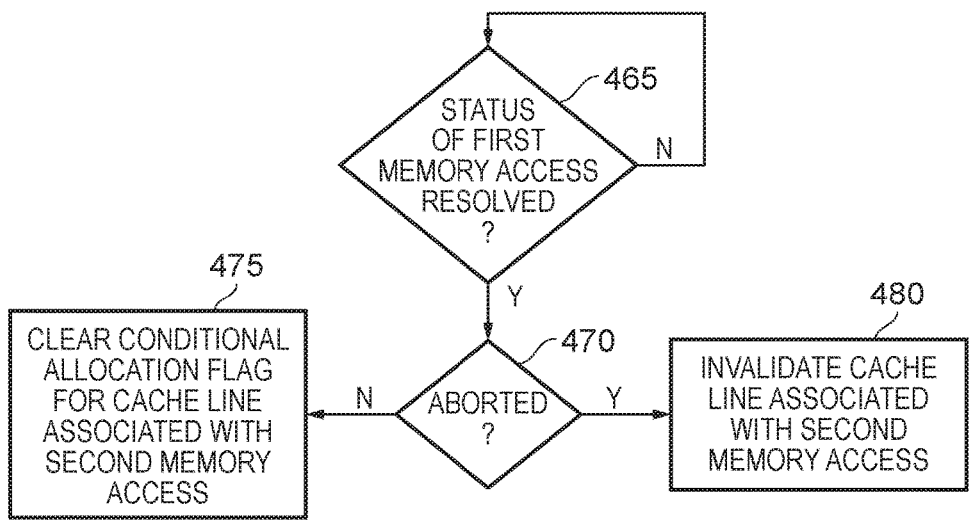
FIG. 10C

APPARATUS AND METHOD FOR CONTROLLING ALLOCATION OF DATA INTO A CACHE STORAGE

BACKGROUND

The present disclosure relates to a technique for controlling allocation of data into a cache storage.

A data processing apparatus may support speculative execution of instructions, in which instructions are executed before it is known whether input operands for the instruction are correct or whether the instruction needs to be executed at all. For example, a processing apparatus may have a branch predictor for predicting outcomes of branch instructions so that subsequent instructions can be fetched, decoded and executed speculatively before it is known what the real outcome of the branch should be. Also some systems may support data prefetching as a form speculation where values are loaded from memory in anticipation of them being needed by the processing circuitry, to allow subsequent instructions to be processed faster. Other forms of speculation are also possible.

It has recently been identified that in certain instances allocation of data into the cache storage based on speculative execution of instructions can open up a source of attack to seek to identify sensitive data. For example, information has recently been published about speculation-based cache timing side-channel attacks, where a number of techniques can be used so that cache timing analysis can be abused to leak information out of mis-speculated execution of instructions.

SUMMARY

In a first example configuration, there is provided an apparatus comprising: processing circuitry to execute instructions; a cache storage to store data accessed when executing the instructions; and cache control circuitry arranged, whilst a sensitive allocation condition is determined to exist, to be responsive to the processing circuitry speculatively executing a memory access instruction that identifies data to be allocated into the cache storage, to allocate the data into the cache storage and to set a conditional allocation flag in association with the data allocated into the cache storage; the cache control circuitry being responsive to detecting an allocation resolution event, to determine based on a type of the allocation resolution event whether to clear the conditional allocation flag such that the data is thereafter treated as unconditionally allocated, or to cause invalidation of the data in the cache storage.

In another example configuration, there is provided a method of controlling allocation of data into cache storage used to store data for access by processing circuitry when executing instructions, comprising: whilst a sensitive allocation condition is determined to exist, responding to the processing circuitry speculatively executing a memory access instruction that identifies data to be allocated into the cache storage, by allocating the data into the cache storage and setting a conditional allocation flag in association with the data allocated into the cache storage; and on detecting an allocation resolution event, determining based on a type of the allocation resolution event whether to clear the conditional allocation flag such that the data is thereafter treated as unconditionally allocated, or to cause invalidation of the data in the cache storage.

In a still further example configuration, there is provided an apparatus comprising: processing means for executing instructions; cache storage means for storing data accessed when executing the instructions; and cache control means, whilst a sensitive allocation condition is determined to exist, for responding to the processing means speculatively executing a memory access instruction that identifies data to be allocated into the cache storage means, by allocating the data into the cache storage means and setting a conditional allocation flag in association with the data allocated into the cache storage means; the cache control means for responding to detection of an allocation resolution event, by determining based on a type of the allocation resolution event whether to clear the conditional allocation flag such that the data is thereafter treated as unconditionally allocated, or to cause invalidation of the data in the cache storage means.

BRIEF DESCRIPTION OF THE DRAWINGS

The present technique will be described further, by way of illustration only, with reference to examples thereof as illustrated in the accompanying drawings, in which:

FIGS. 10A to 10C illustrate how speculative execution of a memory access instruction, whilst the outcome of an earlier memory access instruction is not yet known, may be handled by the cache control circuitry in accordance with one example arrangement.

DESCRIPTION OF EXAMPLES

Figure 1:
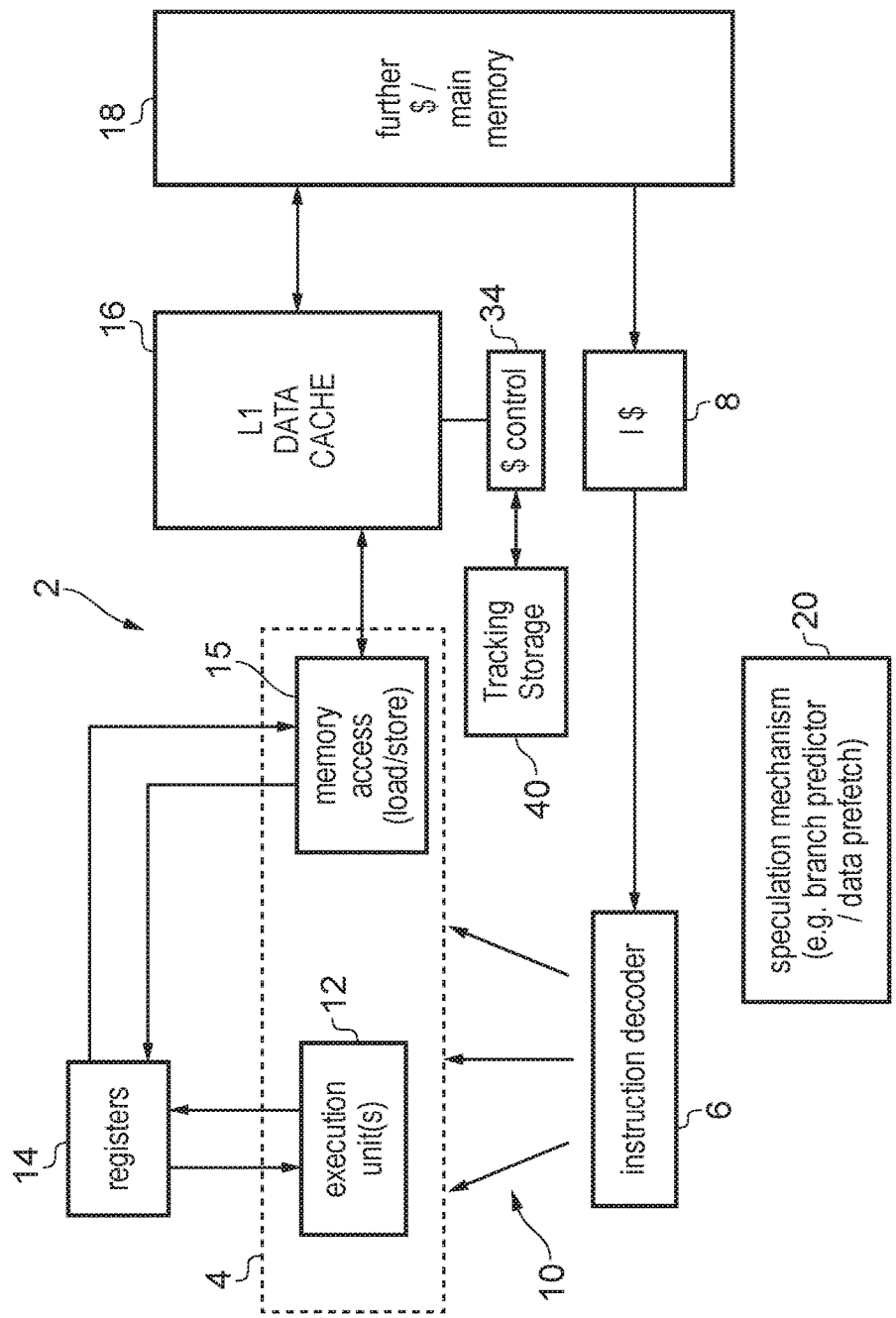
FIG. 1 is a block diagram of an apparatus in accordance with one example.

In one example arrangement, an apparatus is provided that comprises processing circuitry for executing instructions, and a cache storage for storing data accessed when executing the instructions. Cache control circuitry is used to control how data is allocated into the cache storage, and in particular, whilst a sensitive allocation condition is determined to exist, it does not merely allocate data in the usual manner when the processing circuitry speculatively executes memory access instructions. Instead, whilst the sensitive allocation condition is determined to exist, the cache control circuitry is responsive to the processing circuitry speculatively executing a memory access instruction that identifies data to be allocated into the cache storage, to allocate the data into the cache storage but to set a conditional allocation flag in association with the data allocated into the cache storage. The conditional allocation flag can be stored in a variety of ways, and may for example be stored in a separate storage structure to the cache storage. However, in one example arrangement, the conditional allocation flag is stored within the cache storage in association with a cache line in to which the data is allocated.

As a result of the above process, at certain points in time there will be at least some data in the cache storage that has the conditional allocation flag set in association with it. The cache control circuitry is then responsive to detecting an allocation resolution event relating to such data, to determine based on a type of the allocation resolution event whether to clear the conditional allocation flag for that data such that the data is thereafter treated as unconditionally allocated, or to cause invalidation of that data in the cache storage.

Hence, in the presence of a sensitive allocation condition, rather than merely preventing the data being allocated into the cache at all, the above described technique allows the data to continue to be allocated, but in a way where that allocation can be invalidated if the allocation resolution event indicates that the data should not have been allocated into the cache. However, if instead the allocation resolution event indicates that the data can be allocated into the cache, then this can provide a significant performance improvement, as the data is already conditionally allocated, and can merely be converted into an unconditionally allocated form by clearing the conditional allocation flag.

The sensitive allocation condition may arise for a variety of reasons, and the above described approach can be used whatever the form of sensitive allocation condition. However, one specific example scenario of a sensitive allocation condition may be when speculative memory access instructions are being executed in a way that could allow derivation of sensitive data based on a cache timing side-channel attack.

In particular, Google have recently published information about speculation-based cache timing side-channel attacks, where a number of techniques can be used so that cache timing analysis can then be abused to leak information out of mis-speculated execution of instructions. The basic principle behind cache timing side-channels is that the pattern of allocations into the cache, and in particular which cache sets have been used for allocation, can be determined by measuring the time taken to access entries that were previously in the cache, or by measuring the time to access the entries that have been allocated. This can then be used to determine which addresses have been allocated into the cache. The novelty of speculation-based cache timing side-channels is their use of speculative memory reads. Speculative memory reads are typical of advanced microprocessors, and part of the overall functionality which enables high performance.

By performing a first speculative memory read to a cacheable location beyond an architecturally unresolved branch (or other change in program flow), the result of that read can itself be used to form the addresses of further speculative memory reads. These speculative reads cause allocations of entries into the cache whose addresses are indicative of the values of the first speculative read. This can become an exploitable side-channel if untrusted code is able to control the speculation in such a way that it causes a first speculative read of a location which would not otherwise be accessible by that untrusted code. In particular, the effects of the second and subsequent speculative allocations into the cache can be measured by the untrusted code.

Assuming that measures can be taken to alleviate an attacker from deriving useful information from the data evicted from the cache by such speculative memory accesses, then the above described technique can also inhibit the attacker from taking steps to measure the time to access the entries that have been allocated. In particular, during the period when such memory accesses may be speculatively executed, the data allocated into the cache as a result of those accesses is marked as conditionally allocated. The allocation resolution event may then occur when the unresolved change in program flow has been resolved, and hence it is known whether those speculative memory access instructions should have been executed or not. If not, then the conditionally allocated data can be invalidated in the cache, hence preventing performance of a cache timing side-channel attack based on that data.

Hence, in one example, the sensitive allocation condition is determined to exist at least when a requirement to execute the memory access instruction is dependent on an outcome of a branch operation that is unresolved at a time the processing circuitry speculatively executes the memory access instruction. Further, the allocation resolution event may be considered to occur at least when the outcome of the branch operation is resolved.

In one example arrangement, when the outcome of the branch operation indicates that execution of the memory access instruction is required, the cache allocation circuitry is arranged to clear the conditional allocation flag associated with the data in the cache storage that was accessed by the speculative execution of the memory access instruction, and when the outcome of the branch instruction indicates that the memory access instruction is not to be executed, the cache allocation circuitry is arranged to cause invalidation of the data in the cache storage that was accessed by the speculative execution of the memory access instruction. Hence, such an approach can effectively protect against any speculation-based cache timing side-channel attack that is directed at cache lines that have been allocated as a result of the speculative memory access, whilst still enabling the performance benefit of speculatively executing the memory access instruction to be obtained in situations where it is determined that the memory access instruction should indeed be executed.

The sensitive allocation condition may be determined to exist for any type of branch operation where the outcome is unresolved at the time the memory access instruction is to be speculatively executed, or alternatively may be considered to exist only for certain types of branch operation. In one particular arrangement, the branch operation is a range check operation to determine whether a memory address identifying the data to be accessed by the memory access instruction is within an allowable range of memory addresses, and the memory access instruction is to be executed when the memory address is within the allowable range. It has been found that such a range check operation is one of the specific types of branch operation that can be used when seeking to exploit the above-mentioned speculation-based cache timing side-channels. In particular, it is common for untrusted software to pass to trusted software a data value to be used as an offset into an array or similar structure that will be accessed by the trusted software. Ultimately, the trusted software may detect that the data value passed is not allowed, but due to speculative execution the earlier-mentioned memory access instructions based on that untrusted value may have been performed in the interim, and resulted in data being allocated into the cache.

Certain software techniques can be used to seek to mitigate against the earlier-mentioned speculation-based cache timing side-channel attacks, by reducing the extent to which speculation can occur. One such software approach involves the use of a speculation barrier instruction, and in accordance with the techniques described herein the presence of a speculation barrier instruction can be used to identify the sensitive allocation condition.

For example, in one implementation, the sensitive allocation condition may be determined to exist at least when a speculation barrier instruction is encountered in a sequence of instructions, the speculation barrier instruction preventing the processing circuitry speculatively executing one or more types of instructions appearing after the speculation barrier instruction in the sequence during a barrier period, the barrier period ending when speculation is resolved in respect of any speculatively executed instructions appearing before the speculation barrier instruction in the sequence. The types of instruction that are prevented from being speculatively executed can vary dependent on implementation, but in general any instruction that may cause a change in state of an architecturally invisible resource to occur can be prevented from speculative execution by the speculation barrier instruction. Hence, the speculation barrier instruction can be used to seek to ensure that any instructions that are allowed to execute during the barrier period are only instructions that will cause no visible side effect as a result of their execution. Hence, typically instructions that could cause an update to a micro-architectural structure such as a cache or a branch prediction mechanism may be prevented from speculative execution during the barrier period by the speculation barrier instruction.

However, in accordance with the techniques described herein, with regards to the cache structure, the use of the earlier-described techniques allows a certain relaxation in the constraint to be provided, in that a memory access instruction may be allowed to be speculatively executed during the barrier period, but with the data allocated into the cache storage having the conditional allocation flag set. Although execution of the memory access instruction may cause a change in the state of an architecturally invisible resource, in this case the cache, that effect can then be reversed if it is determined that the memory access instruction should not have been executed, by invalidating the conditionally allocated data.

In one example scenario where the sensitive allocation condition is determined to exist when a speculation barrier instruction is encountered, the allocation resolution event may occur at least when speculation is resolved in respect of any speculatively executed instructions appearing before the speculation barrier instruction in the sequence. When the resolution of the speculation indicates an incorrect speculation was made, the cache control circuitry is arranged to cause the conditionally allocated data to be invalidated in the cache storage. Hence, the effects of the speculative execution of the memory access instruction can be reversed if any incorrect speculation was made with regards to the instructions appearing before the speculation barrier instruction. In one particular example, the speculation barrier instruction can be inserted immediately after the earlier-mentioned branch instruction.

In addition to the examples above, there are other situations that can trigger the sensitive allocation condition. For example, in one implementation the sensitive allocation condition may be determined to exist at least when a state of the processing circuitry changes from a first state to a second state, in the second state the processing circuitry having access to data at one or more memory addresses not accessible when the processing circuitry is in the first state. Hence, at least with regards to the memory addresses of interest, the processing circuitry in the second state can be viewed as having a higher level of privilege than the processing circuitry when in the first state. The data at the one or more memory addresses may be sensitive data that it is desired to keep secret from the processing circuitry when operating in the first state. By triggering the sensitive allocation condition when the processing circuitry changes from the first state to the second state, this will ensure that any speculatively executed memory access instructions have their data allocated into the cache storage as conditionally allocated.

In such an implementation, the allocation resolution event may occur at least when the state of the processing circuitry changes from the second state to the first state, the cache control circuitry being arranged, when the conditional allocation flag is still set when the state of the processing circuitry changes from the second state to the first state, to cause invalidation of the associated data within the cache storage. Hence, if any conditionally allocated data is still being treated as conditionally allocated by the time control is passed back to the processing circuitry in the first state, then that conditionally allocated data can be invalidated, hence removing the possibility of the processing circuitry in the first state seeking to perform any cache timing analysis in respect of those allocated cache lines.

Data that has been conditionally allocated can be converted into fully allocated data for a number of reasons. For example, the allocation resolution event may also occur at least when a further memory access instruction executed non-speculatively causes access to data in the cache storage whose associated conditional allocation flag is set. In that event the cache control circuitry may be responsive to the access caused by execution of the further memory access instruction to clear the conditional allocation flag such that the data is thereafter treated as unconditionally allocated. In particular, if a non-speculative access occurs which hits on the conditionally allocated data in the cache storage, this means that that data should indeed be present in the cache storage, and hence it is safe to clear the conditional allocation flag at that point. Thereafter, that data will be treated as unconditionally allocated going forward.

In one example arrangement, the apparatus may include data prefetch circuitry for performing data prefetch operations to preload data in anticipation of that data being required by the processing circuitry. Typically, the data may be preloaded into one of the registers of the processing circuitry, but as part of that process may be cached within the cache storage. In accordance with one example arrangement, the cache control circuitry is further arranged, at least whilst the sensitive allocation condition is determined to exist, to set the conditional allocation flag in association with preloaded data obtained by the data prefetch circuitry and allocated into the cache storage. Hence, this enables the preloaded data that ends up being allocated into the cache to be treated as conditionally allocated.

In some implementations, the cache control circuitry may be arranged to always treat data allocated into the cache as part of a data prefetch operation as conditionally allocated in the first instance. Then, as per the mechanism discussed earlier, if a genuine non-speculatively executed instruction accesses that data, the conditional allocation flag can be cleared. However, in an alternative approach, the handling of the prefetched data in such a manner may be limited to situations where the sensitive allocation condition exists. Then, on the associated allocation resolution event, the data can either be converted into unconditionally allocated data, or invalidated depending on the type of the allocation resolution event. For example, if the sensitive allocation condition is the presence of the speculation barrier instruction, then any prefetched data that is allocated into the cache storage during the barrier period can be marked as conditionally allocated, and can then later be converted into unconditionally allocated data if, at the time of resolution in respect of any speculatively executed instructions appearing before the speculation barrier instruction, no mispredictions were detected. However, in the event of any mispredictions, then the prefetched data in the cache can be invalidated.

As another example of the sensitive allocation condition, the sensitive allocation condition may be determined to exist at least when a preceding memory access instruction is executed that may abort, and the memory access instruction that is speculatively executed by the processing circuitry is a memory access instruction that is not to be executed if the preceding memory access instruction aborts.

Hence, it can be seen that the above described techniques provide a great deal of flexibility when allocating data into the cache in a variety of different situations, enabling data at certain points in time to be conditionally allocated into the cache, and then later either converted into fully allocated data, or invalidated.

In one example implementation, whilst the sensitive allocation condition exists, the processing circuitry is arranged to speculatively execute multiple memory access instructions, to cause data to be allocated into multiple entries of the cache storage with the associated conditional allocation flags set. Then the allocation resolution event is a global allocation resolution event that applies equally to the data in each of the multiple entries, the cache control circuitry may be arranged, dependent on the type of the global allocation resolution event, to either clear the conditional allocation flags for each of the multiple entries, or to cause invalidation of the data in each of the multiple entries. Hence, one allocation resolution event may relate to multiple conditionally allocated cache lines, and may be used to trigger resolution in respect of each of those cache lines, so that they are either all made fully allocated cache lines, or all invalidated.

The type of memory access instruction that is speculatively executed and treated in the manner discussed earlier (with regard to how the data accessed is then allocated into the cache) can take a variety of forms. For example, in one implementation, the memory access instruction that is speculatively executed by the processing circuitry is a load instruction executed to load data from memory into at least one register accessible to the processing circuitry. In some systems, it may be the case that store instructions are not executed speculatively, and accordingly there is no need to employ the above described mechanism in respects of store instructions. However, in implementations where both load and store instructions could be speculatively executed, then the same technique can also be used for the speculatively executed store instructions if desired.

There are a number of ways in which the cache control circuitry can invalidate a conditionally allocated cache line. For instance, if that data is still clean, i.e. a copy of that data already exists within the lower levels of the memory system, it may be sufficient merely to clear the valid flag in association with the relevant data. However, when the cache control circuitry causes the data to be invalidated and the data is marked as dirty, the cache control circuitry may cause the data to be evicted from the cache storage to a lower level of the memory system, in addition to the associated entry in the cache being marked as invalid. Hence, in this case the invalidate operation comprises effectively a clean and invalidate operation in order to ensure that any updates to the data are not lost within the memory system.

As discussed above, the allocation resolution event can take a variety of forms. However, in one implementation, the allocation resolution event occurs at least when an associated sensitive allocation event giving rise to the sensitive allocation condition has been resolved. Whether at that point the relevant conditionally allocated cache lines are converted into fully allocated cache lines or invalidated will depend on the nature of the resolution that has occurred.

In one example implementation, the cache storage comprises a plurality of cache lines, and the cache control circuitry is arranged to mark a cache line as a conditionally allocated cache line when allocating data into that cache line whilst the sensitive allocation condition exists. Multiple sensitive allocation events may occur before the associated allocation resolution events occur, and the apparatus may further comprise a tracking storage referenced by the cache control circuitry to identify, for each awaited allocation resolution event, which conditionally allocated cache lines are associated with that allocation resolution event.

Hence, in such arrangements it is possible to have a degree of nesting of sensitive allocation events and associated allocation resolution events. In such instances, the tracking storage can keep track of which cache lines are associated with which levels of nesting, so as to ensure that when a resolution is reached in respect of a particular level of nesting, the appropriate action can be taken in respect of the relevant cache lines.

Particular examples will now be described with reference to the Figures.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 includes one or more execution units 12 for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes a memory access unit (or load/store unit) 15 for controlling transfer of data between the registers 14 and the memory system. The memory system includes the instruction cache 8, a data cache 16 and further storage provided downstream from the data cache 16 and instruction cache 8, such as further levels of cache (e.g. level 2 or level 3 caches) and main memory 18. In response to load operations the memory access circuitry 15 controls the memory system to return data associated with a given address and writes the loaded data to the registers 14. In response to store operations, values from the registers 14 are written to the memory system by the memory access circuitry 15.

As shown in FIG. 1, the apparatus 2 may have at least one form of speculation mechanism 20 for making a prediction about the expected behaviour of certain instructions to be processed by the processing circuitry 4 and controlling the apparatus to execute subsequent instructions speculatively depending on the predicted outcome of the earlier instructions. For example the speculation mechanism 20 could comprise a branch predictor for predicting taken/not taken outcomes of branch instructions and/or for predicting the target addresses of branch instructions so that subsequent instructions can be fetched, decoded and executed speculatively without needing to wait for the actual branch outcome to be resolved. If the branch prediction turns out to be incorrect, then the architectural effects of the subsequently executed speculative instructions on the registers 14 can be reversed and architectural state in the registers 14 can be restored to the point at which the branch was encountered, and then an alternative path of instructions can be executed following the branch. However if the branch is correctly predicted then by filling the pipeline with subsequent instructions earlier, this enables performance to be improved.

Another example of a speculation mechanism 20 may be a data prefetch mechanism that is used to seek to prefetch data into the registers 14 in anticipation of that data being required by the processing circuitry for. During that process, the prefetched data may be allocated into the data cache 16.

Speculative execution of instructions by the processing circuitry 4 before it is actually known whether the inputs to those instructions are correct or whether those instructions needed to be executed at all, can be extremely beneficial in providing high processor performance. However, it has recently been recognised that if such speculation leads to memory accesses being performed speculatively, allocations into the cache 16 triggered by the speculative memory accesses may remain visible even after a speculative instruction has been resolved as mispredicted or incorrectly speculated and the architectural effects of the speculative re-executed instructions have been reversed. This can then allow subsequently executed code to investigate what data was loaded by earlier code by using cache timing side-channels. The basic principle behind cache timing side-channels is that the pattern of allocations into the cache, and, in particular, which cache sets have been used for the allocation, can be determined by measuring the time taken to access entries that were previously in the cache, or by measuring the time to access the entries that have been allocated. This then can be used to determine which addresses have been allocated into the cache.

Speculation-based cache timing side-channels using speculative memory reads have recently been proposed. Speculative memory reads are typical of advanced microprocessors and part of the overall functionality which enables very high performance. By performing speculative memory reads to cacheable locations beyond an architecturally unresolved branch (or other change in program flow), and, further, using the result of those reads themselves to form the addresses of further speculative memory reads, these speculative reads cause allocations of entries into the cache whose addresses are indicative of the values of the first speculative read. This becomes an exploitable side-channel if untrusted code is able to control the speculation in such a way it causes a first speculative read of location which would not otherwise be accessible at that untrusted code, but the effects of the second speculative allocation within the caches can be measured by that untrusted code.

For any form of supervisory software, it is common for untrusted software to pass a data value to be used as an offset into an array or similar structure that will be accessed by the trusted software. For example, an application (untrusted) may ask for information about an open file, based on the file descriptor ID. Of course, the supervisory software will check that the offset is within a suitable range before its use, so the software for such a paradigm could be written in the form:

```
1    struct array {
2        unsigned long length;
3        unsigned char data[ ];
4    };
5    struct array *arr = . . . ;
6    unsigned long untrusted_offset_from_user = . . . ;
7    if (untrusted_offset_from_user < arr->length) {
8        unsigned char value;
9        value =arr->data[untrusted_offset_from_user];
10       . . .
11   }
```

In a modern microprocessor, the processor implementation commonly might perform the data access (implied by line 9 in the code above) speculatively to establish value before executing the branch that is associated with the untrusted_offset_from_user range check (implied by line 7). A processor running this code at a supervisory level (such as an OS Kernel or Hypervisor) can speculatively load from anywhere in Normal memory accessible to that supervisory level, determined by an out-of-range value for the untrusted_offset_from_user passed by the untrusted software. This is not a problem architecturally, as if the speculation is incorrect, then the value loaded will be discarded by the hardware.

However, advanced processors can use the values that have been speculatively loaded for further speculation. It is this further speculation that is exploited by the speculation-based cache timing side-channels. For example, the previous example might be extended to be of the following form:

```
1    struct array {
2        unsigned long length;
3        unsigned char data[ ];
4    };
5    struct array *arr1 = . . . ; /* small array */
6    struct array *arr2 = . . . ; /*array of size 0x400 */
7    unsigned long untrusted_offset_from_user =. . . ;
8        if (untrusted_offset_from_user < arr1->length) {
9            unsigned char value;
10           value =arr1->data[untrusted_offset_from user] ;
11           unsigned long index2 = ( (value&1) *0x100)+0x200;
12           if (index2 < arr2->length) {
13               unsigned char value2 = arr2->data[index2];
14           }
15   }
```

In this example, "value", which is loaded from memory using an address calculated from arr1->data combined with the untrusted_offset_from_user (line 10), is then used as the basis of a further memory access (line 13). Therefore, the speculative load of value2 comes from an address that is derived from the data speculatively loaded for value. If the speculative load of value2 by the processor causes an allocation into the cache, then part of the address of that load can be inferred using standard cache timing side-channels. Since that address depends on data in value, then part of the data of value can be inferred using the side-channel. By applying this approach to different bits of value, (in a number of speculative executions) the entirety of the data of value can be determined. Hence, the untrusted software can, by providing out-of-range quantities for untrusted_offset_from_user, access anywhere accessible to the supervisory software, and as such, this approach can be used by untrusted software to recover the value of any memory accessible by the supervisory software.

Modern processors have multiple different types of caching, including instruction caches, data caches and branch prediction cache. Where the allocation of entries in these caches is determined by the value of any part of some data that has been loaded based on untrusted input, then in principle this side channel could be stimulated.

As a generalization of this mechanism, it should be appreciated that the underlying hardware techniques mean that code past a branch might be speculatively executed, and so any sequence accessing memory after a branch may be executed speculatively. In such speculation, where one value speculatively loaded is then used to construct an address for a second load or indirect branch that can also be performed speculatively, that second load or indirect branch can leave an indication of the value loaded by the first speculative load in a way that could be read using a timing analysis of the cache by code that would otherwise not be able to read that value. This generalization implies that many code sequences commonly generated will leak information into the pattern of cache allocations that could be read by other, less privileged software. The most severe form of this issue is that described earlier in this section, where the less privileged software is able to select what values are leaked in this way.

Hence, it is desirable to provide counter-measures against this type of attack. In accordance with the techniques described herein, the operation of the cache control circuitry 34 is modified so that in the presence of a sensitive allocation condition, it alters the way in which at least some data is allocated into the data cache 16. In particular, when the processing circuitry is speculatively executing a memory access instruction that identifies data to be allocated into the cache, and a sensitive allocation condition is determined to exist, the data is still allowed to be allocated into the cache, but a conditional allocation flag is set in association with the data allocated into the cache. Then, on detecting an allocation resolution event that relates to that conditionally allocated data, it is determined based on the type of the allocation resolution event whether to clear the conditional allocation flag such that the data is thereafter treated as unconditionally allocated, or to cause invalidation of that data in the cache.

As will be apparent from the examples discussed herein, there are a variety of possible sensitive allocation conditions than can be detected, and they may have associated allocation resolution events. Further, additional allocation resolution events may occur that are not directly linked to a sensitive allocation condition. An example of this latter case is where data that has been conditionally allocated into the cache is then accessed via a non-speculative access instruction, indicating that the data should legitimately be in the cache, that event causing the conditionally allocated cache line to be converted into a fully allocated cache line.

Whilst in some implementations there may only be a single sensitive allocation event present at a time, in some instances multiple sensitive allocation events may occur before the associated allocation resolution events occur. In such situations, a tracking storage 40 may be provided in association with the cache control circuitry 34, where the contents of the tracking storage are maintained by the cache control circuitry to identify, for each awaited allocation resolution event, which conditionally allocated cache lines are associated with that allocation resolution event. Thus, when an allocation resolution event is received, it can be determined which conditionally allocated cache lines are affected by that allocation resolution event, and appropriate action can be taken in respect of those identified cache lines, dependent on the form of that allocation resolution event. As discussed earlier, this may involve converting all of those relevant cache lines into fully allocated cache lines by clearing their conditional allocation flags, or may require invalidation of the data in those affected cache lines.

Figure 2:
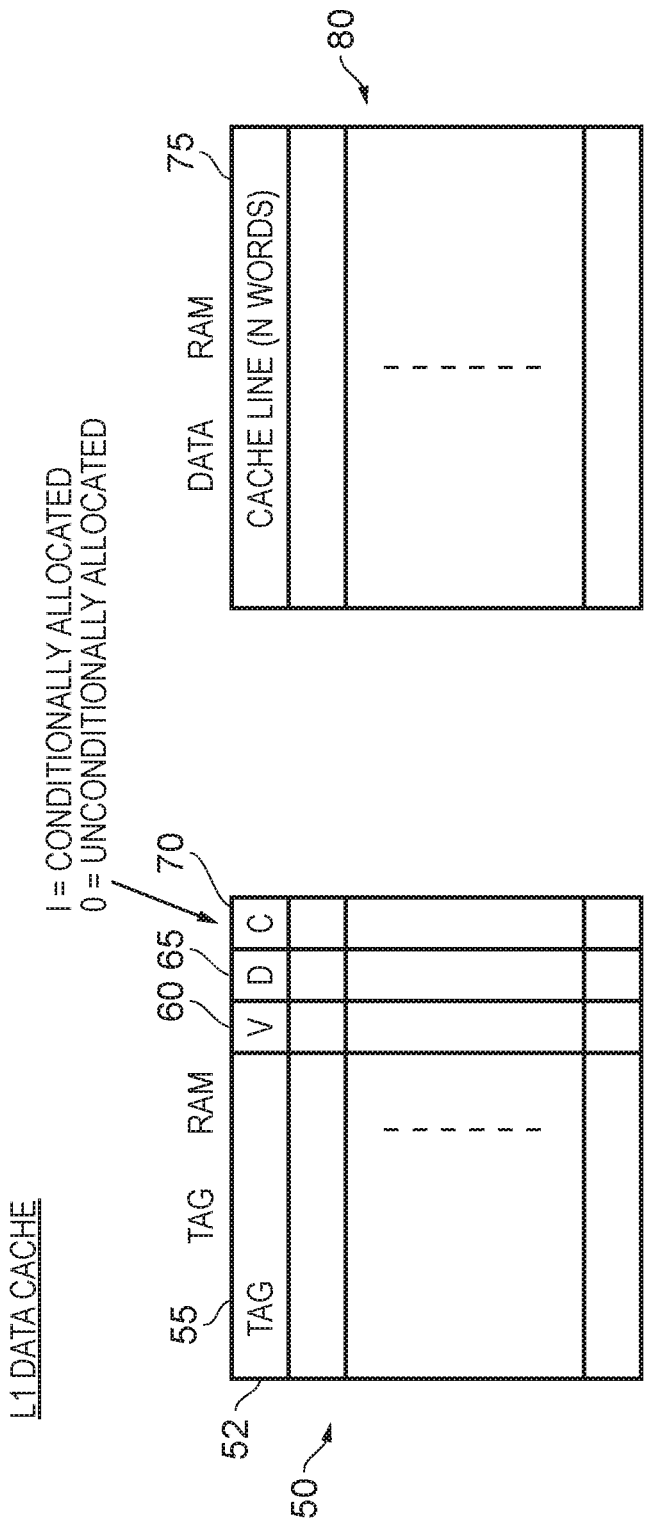
FIG. 2 illustrates in more detail the level 1 data cache of FIG. 1 in one example arrangement.

The conditional allocation flag information may be maintained in a variety of ways, provided it can be determined which cache lines have been conditionally allocated into the cache. FIG. 2 illustrates one example arrangement where a conditional allocation flag is provided in association with each cache line entry, by use of an additional bit of information within the associated tag RAM entry. In particular, for each cache line 75 within the data RAM 80 of the cache, a corresponding tag RAM entry 52 is provided within the tag RAM 50 of the cache. As will be understood by those skilled in the art, the tag RAM entry will include a tag portion 55, this being a portion of the address that is compared with the address of a lookup request in order to determine whether there is a hit in that entry, i.e whether the address specified by the lookup request is seeking to access the data stored in the associated cache line 75. Additional information may also be provided within the tag RAM entry 52, including a valid flag 60 to identify whether the corresponding cache line contents are valid, and a dirty flag 65 which can be set to indicate that the contents of the cache line 75 are more up to date than the corresponding data in the memory system. In the event that the dirty flag is set, then when that cache line is to be invalidated, for example to make space for a new line of data to be allocated into the cache, the current cache line contents will first need to be evicted to the memory system.

As shown in FIG. 2, an additional field 70 can be provided in each tag RAM entry 52 to identify whether the data in the corresponding cache line 75 is conditionally allocated or not. In one particular example, when the flag 70 is set to a logic 1 value this indicates that the data is conditionally allocated, and when it is set to a logic 0 value this indicates that the data is unconditionally allocated.

Whilst FIG. 2 illustrates one specific way in which the conditional allocation flag information may be maintained, it will be appreciated that other structures may be used to maintain the conditional allocation information for the affected cache lines.

Figure 3:
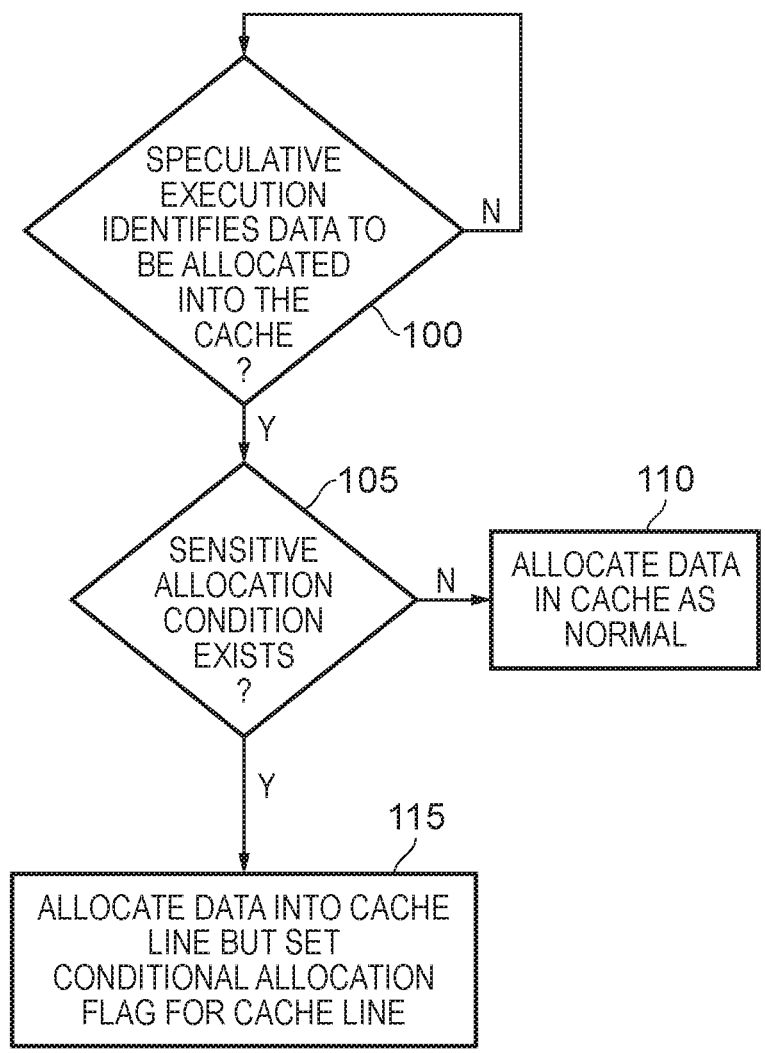
FIG. 3 is a flow diagram illustrating steps taken by the cache control circuitry in one example in order to determine how to allocate data into the cache.

FIG. 3 is a flow diagram illustrating the operation of the cache control circuitry 34 in one example arrangement. At step 100 it is determined whether speculative execution of a memory access instruction has identified data to be allocated into the cache 16. If so, it is then determined at step 105 whether the sensitive allocation condition exists, and if not the process proceeds to step 110 where the data is allocated into the cache in the normal manner. However, if the sensitive allocation condition exists, the process proceeds to step 115 where the data is allocated into the cache line, but the conditional allocation flag is set for that cache line. In one example implementation, the valid flag is set upon such conditional allocation, so as to allow hits to then occur in respect of the conditionally allocated data. In other implementations, both the valid and conditional flag information may be combined together into a specific encoding and hits in respect of conditionally allocated valid cache lines may be treated slightly differently to hits in respect of unconditionally allocated cache lines.

Figure 4:
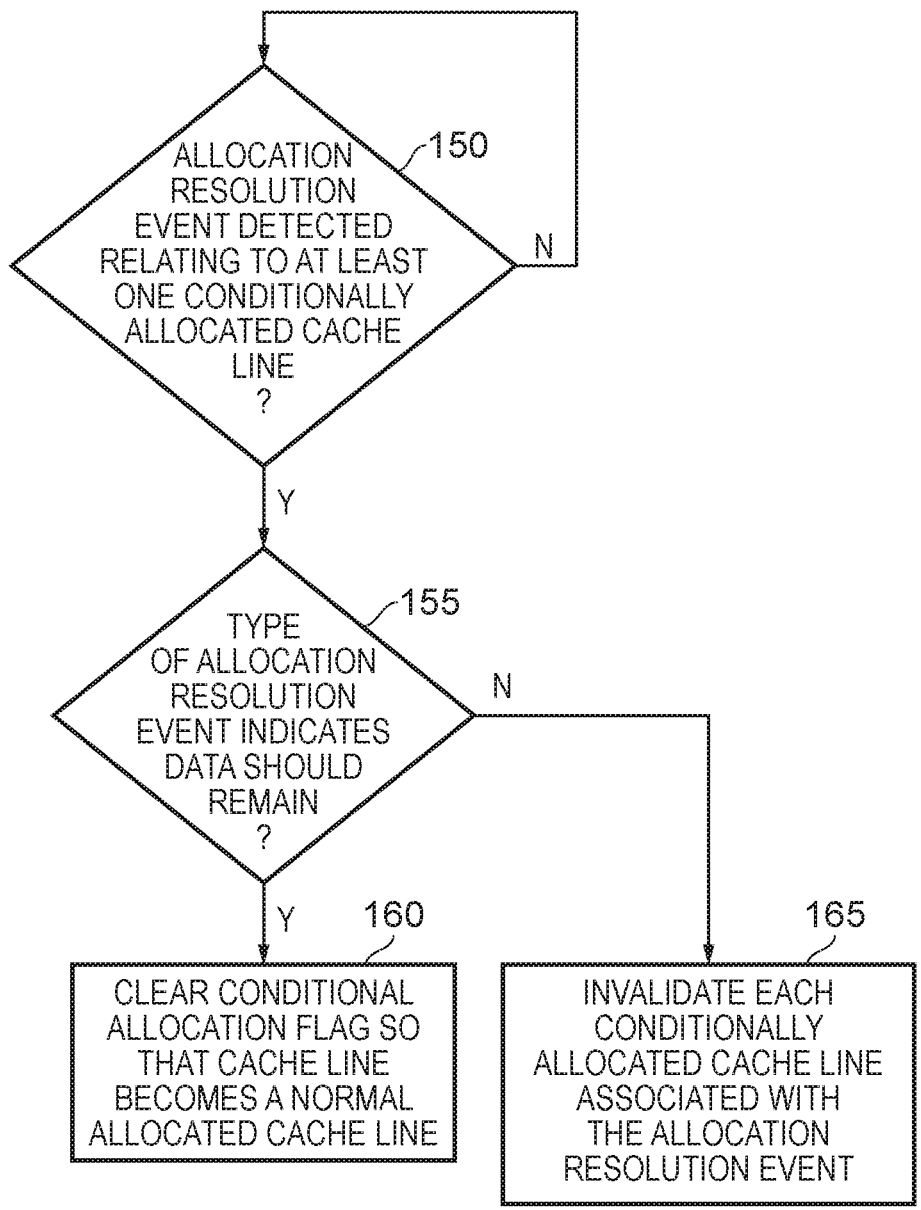
FIG. 4 is a flow diagram illustrating steps taken by the cache control circuitry in response to detection of an allocation resolution event, in accordance with one example arrangement.

FIG. 4 is a flow diagram illustrating how the cache control circuitry processes an allocation resolution event. At step 150, it is determined whether an allocation resolution event has been detected that relates to at least one conditionally allocated cache line. When such an allocation resolution event is detected, then at step 155 it is determined whether the type of allocation resolution event indicates that the data should remain within the cache. As will be discussed with reference to the remaining figures, there are a variety of different types of allocation resolution event that could be used, and depending on the information associated with that allocation resolution event, it may be determined whether the relevant conditionally allocated data should remain within the cache or not. If it is determined that the data should remain within the cache, then the process proceeds to step 160 where the conditional allocation flag is cleared in respect of each of the cache lines associated with the allocation resolution event so that each of those cache line becomes a normal allocated cache line. As mentioned earlier, in one embodiment the valid flag is set at the time of conditional allocation, and accordingly all that is required is to clear the allocation flag. However, where the valid flag and conditional flag information are incorporated within a single encoding, then the state of that encoding will change so as to identify that the data is no longer conditionally allocated, and is now treated as fully allocated valid data.

If at step 155 it is determined that the type of allocation resolution event indicates that the data should not remain in the cache, then the process proceeds to step 165 where each conditionally allocated cache line associated with the allocation resolution event is invalidated.

As mentioned earlier, in one implementation, it may be the case that there is only one level of speculation at any point in time relevant to the conditional allocation of cache lines into the cache, and accordingly when the associated resolution event occurs, the action can be taken in respect of all of the conditionally allocated cache lines. However, in other implementations, a level of nesting may be supported, where multiple sensitive allocation events that would trigger presence of the sensitive allocation condition may occur before the associated allocation resolution events occur. As discussed earlier with reference to FIG. 1, a tracking storage 40 may be maintained by the cache control circuitry 34 in that event, to keep track of which conditionally allocated cache lines are associated with each level of the nesting, so that for each awaited allocation resolution event, it can be determined which conditionally allocated cache lines are associated with that allocation resolution event, and hence which should be subjected to step 160 or step 165 in response to each allocation resolution event received. However, it will be appreciated that there are a number of different mechanisms that could be used to link each allocation resolution event with the relevant conditionally allocated cache lines. For example, a link table operated within the processor (either in conjunction with the reorder buffer, exception FIFO or whatever other mechanism is used to track speculative execution and associated sets of events) could be used.

Figure 5A:
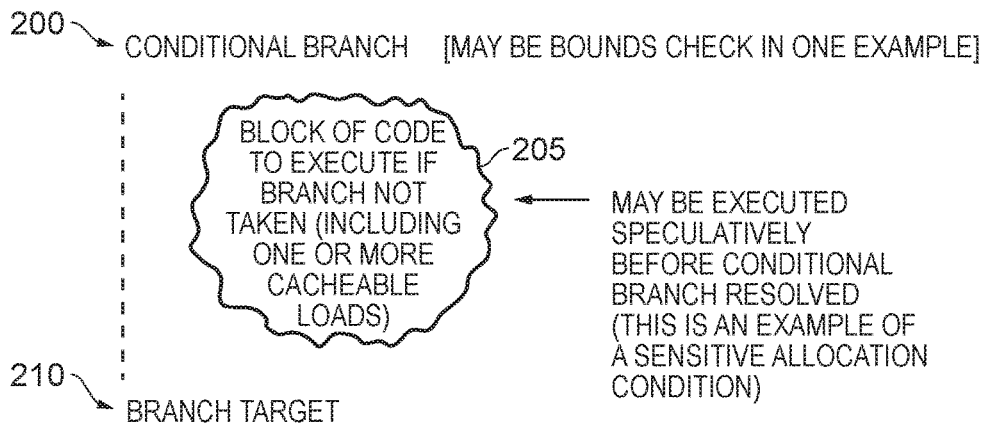
FIG. 5A schematically illustrates one form of sensitive allocation condition where code used to perform one or more cacheable load operations is speculatively executed before a preceding branch operation has been resolved.

FIG. 5A schematically illustrates one scenario that may give rise to detection of the presence of the sensitive allocation condition. In particular, it is assumed that a conditional branch instruction 200 is to be executed, but the outcome of the associated branch operation is unresolved at a time the processing circuitry begins to speculatively execute a block of code 205, where that block of code includes one or more load instructions to cacheable memory addresses that could cause data to be allocated into the cache. The branch target for the conditional branch instruction 200 may be the branch target 210, such that the instruction flow will branch to the branch target 210 if the branch is determined to be taken. However, if it is not taken, then it would be correct to execute the block of code 205. The conditional branch may take a variety of forms, but in one scenario could be a bounds check operation, and hence the example of FIG. 5A is an example of the type of scenario that could be used to seek to speculatively load data into a cache so as to enable untrusted code to perform a speculation-based cache timing side-channel attack. However, in accordance with the techniques described earlier, whilst the sensitive allocation condition is determined to be present, in this case whilst the outcome of the conditional branch is not yet resolved, the cache control circuitry will ensure that any cache lines allocated into the cache as a result of executing the block of code 205 will be marked as conditionally allocated.

Figure 5B:
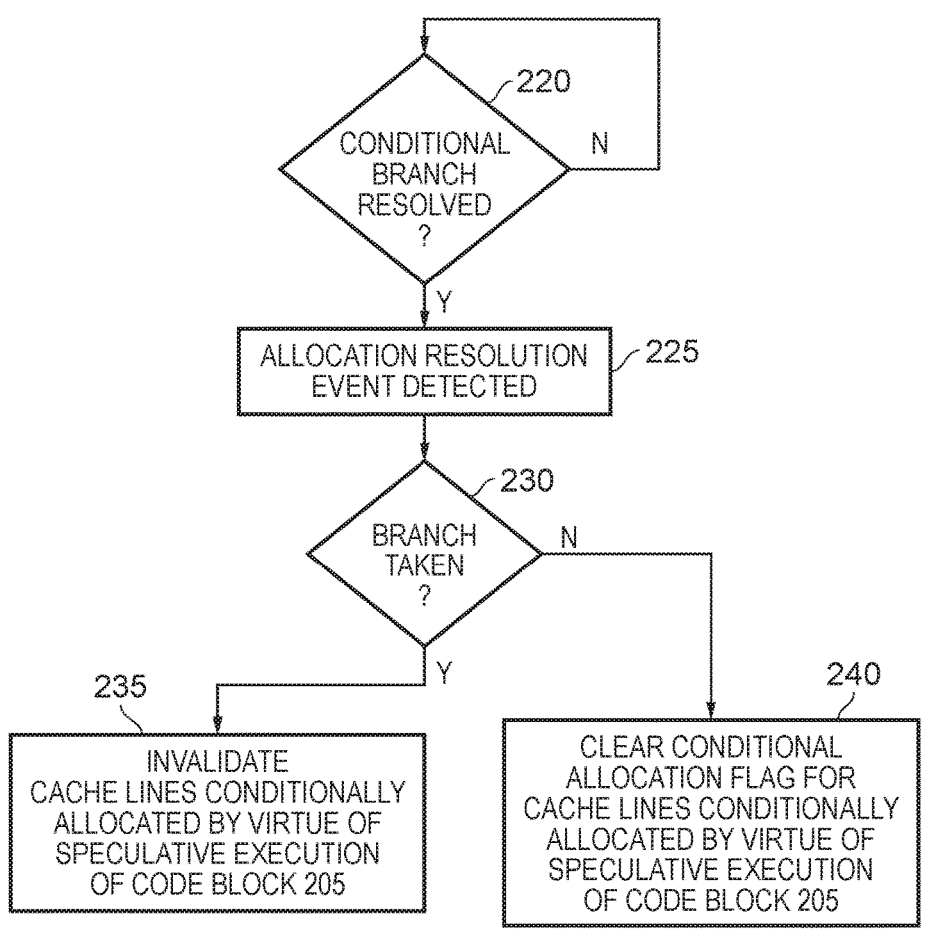
FIG. 5B is a flow diagram illustrating steps taken by the cache control circuitry once the conditional branch has been resolved, in accordance with one example arrangement.

FIG. 5B is a flow diagram illustrating how the cache control circuitry responds to the associated allocation resolution event, in this case when the conditional branch is resolved. At step 220 it is awaited for the conditional branch to be resolved, whereafter at step 225 it is determined that the allocation resolution event has now been detected. At step 230 it is determined whether the branch was taken or not taken. For the example of FIG. 5A, if the branch was not taken, then the block of code 205 should indeed be executed, and accordingly it is acceptable to retain within the cache any of the conditionally allocated data. Accordingly, at step 240 the conditional allocation flag is cleared for the cache lines conditionally allocated by virtue of the speculative execution of code block 205.

Conversely, if the branch was taken, then the block of code 205 should not be executed, and at step 235 the cache lines that were conditionally allocated by virtue of the speculative execution of the code block 205 are invalidated. If any of those cache lines are marked as dirty, then this may require a clean and invalidation operation to be performed, so as to evict the data back to a lower level of the memory system. Whilst the processor will typically be arranged so that it will not write speculatively into the cache, there are certain scenarios where data allocated into the cache during speculative execution may be dirty, and hence needs to be subjected to a clean and invalidate operation in the above situation. For example, in a multi-processor system, cache lines may migrate between the caches of different processors whilst in the dirty state. Hence a first processor might speculatively perform a linefill operation in its local cache, and during that process receive a dirty cache line from a second processor's local cache (due to the cache line having previously been modified but not yet written back to memory). Hence the dirty data is legitimate data that did not arise from speculative execution on the first processor, but from legitimate execution on the second processor. Thus, when in the above-mentioned situation it is decided to flush the cache line from the first processor's cache, the dirty data is written back to memory.

Figure 6A:
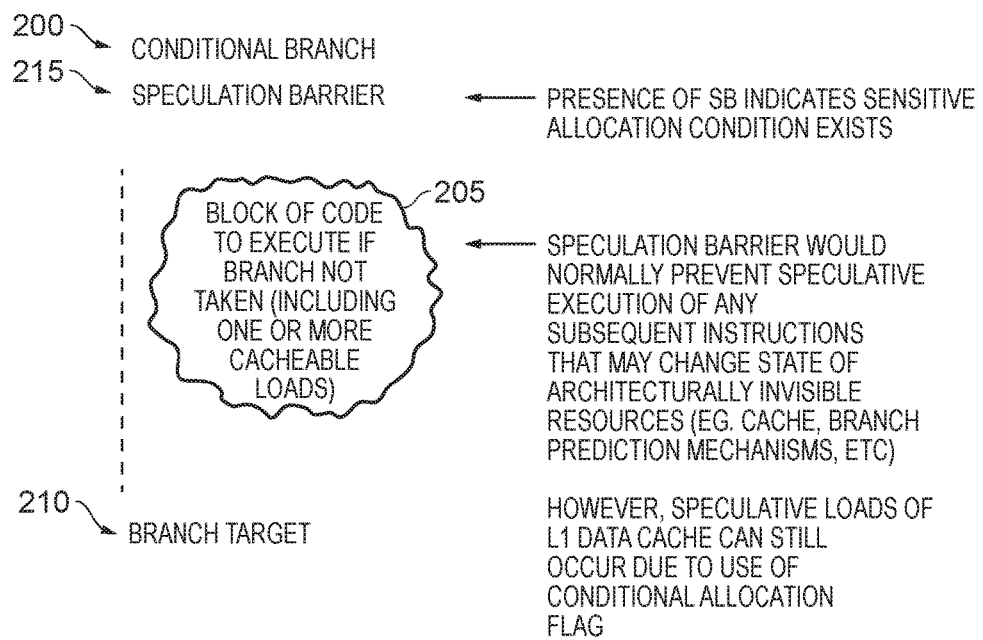
FIG. 6A illustrates an example where the presence of a speculation barrier instruction within a sequence of instructions is used to indicate presence of the sensitive allocation condition.

FIG. 6A illustrates another example scenario that may give rise to presence of the sensitive allocation condition. In this case, essentially the same sequence of code is considered, but in this event it is assumed that a speculation barrier instruction 215 immediately follows the conditional branch instruction 200. The purpose of the speculation barrier instruction is to ensure that processing circuitry is prevented from speculatively executing at least certain types of instruction appearing after the speculation barrier instruction during a barrier period, the barrier period ending when speculation is resolved in respect of any speculatively executed instructions appearing before the speculation barrier instruction in the sequence. Accordingly, in this example, any earlier instructions before the speculation barrier that involve speculative execution, including the conditional branch instruction 200, will need to be resolved, before such instructions appearing after the speculation barrier are allowed to be executed. This can inhibit an attacker from performing the earlier-mentioned speculation-based cache timing side-channel attacks.

The aim of the speculation barrier is to ensure that the only subsequent instructions that can be speculatively executed during the barrier period are those that would produce no visible side effect as a result of their execution. In effect, this means that any instructions that could change the state of architecturally invisible resources such as the contents of the cache, would not normally be allowed to be speculatively executed during the barrier period. However, in accordance with the techniques described earlier, speculative memory accesses are allowed to be performed, due to the fact that they will be allocated conditionally into the cache, and if it is determined at the time that all of the preceding speculation is resolved that those instructions should not be executed, the effects within the cache can be reversed by invalidating those conditionally allocated cache lines.

Figure 6B:
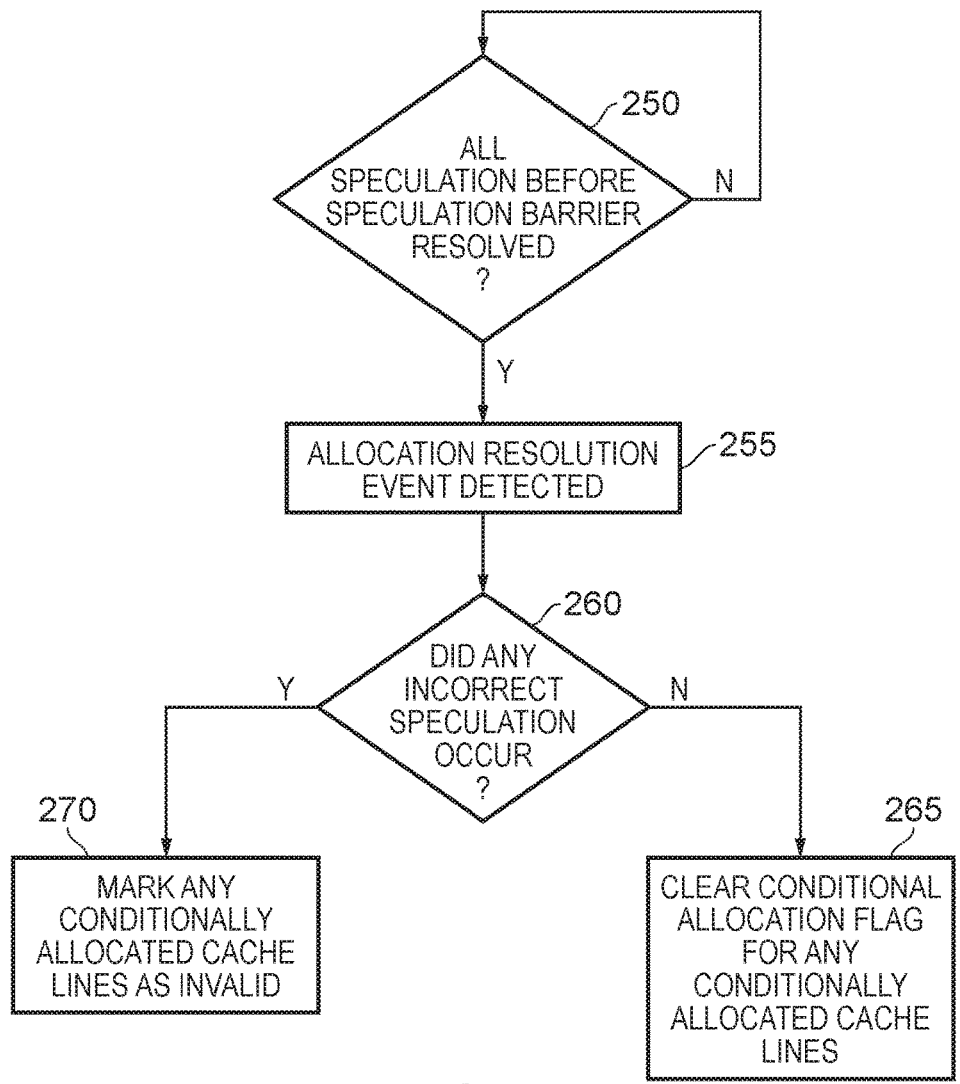
FIG. 6B is a flow diagram illustrating the steps taken by the cache control circuitry in response to an associated allocation resolution event.

FIG. 6B is a flow diagram illustrating the steps performed by the cache control circuitry once all of the preceding speculation before the speculation barrier is resolved. At step 250, the process waits until all speculation before the speculation barrier is resolved. At this point it is determined at step 255 that an allocation resolution event has been detected, and then at step 260 it is determined whether there was any incorrect speculation with regards to the speculatively executed instructions appearing before the speculation barrier. If not, then the conditional allocation flag is cleared for any of the conditionally allocated cache lines within the cache at step 265. However, if there was some degree of mis-speculation occurring, then the process proceeds to step 270 where any conditionally allocated cache lines are marked as invalid.

Figure 7A:
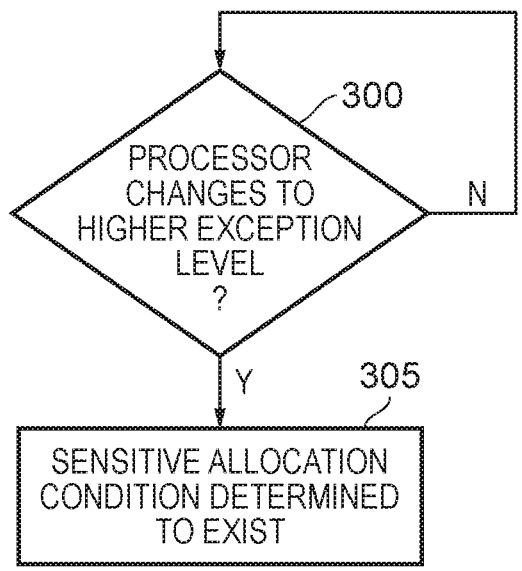
FIGS. 7A and 7B are flow diagrams illustrating how changes in processor exception level may be used to trigger the sensitive allocation condition, and an associated allocation resolution event, in accordance with one example arrangement.
Figure 7B:
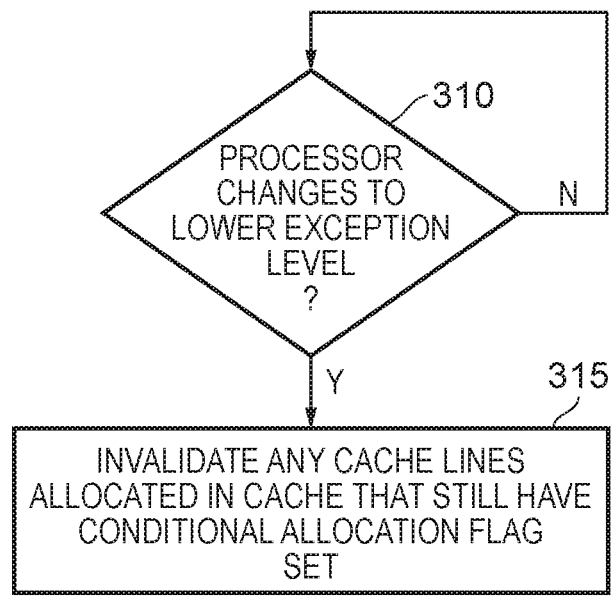

FIG. 7A and FIG. 7B illustrate how in one example implementation the sensitive allocation condition may be determined to exist when a transition from a lower to higher exception level occurs, and then a corresponding allocation resolution event can be detected when the processor changes back to the lower exception level (a change in processor exception level being considered an example of a change in state of the processor). In particular, as shown at FIG. 7A, if the processor changes to a higher exception level 300, then it is determined that the sensitive allocation condition exists at step 305. Whilst the processor is at a higher exception level, it is possible that the processor will have access to sensitive data that is not available to the processor when executing in the lower exception level. Since the earlier-mentioned speculation-based cache timing side-channel attacks are based on untrusted code controlling speculation in such a way as to cause supervisory software to execute a sequence of speculative memory accesses, then by triggering the sensitive allocation condition upon the transition from a lower exception level to a higher exception level, this can ensure that any data allocated into the cache when processing at the higher exception level is initially conditionally allocated into the cache.

During the time the processor is executing at the higher exception level, certain conditionally allocated cache lines may be converted into unconditionally allocated cache lines through the activities being performed at the higher exception level. For example, a non-speculative access may hit within a conditionally allocated cache line, hence indicating that that cache line should be present in the cache. At that point, the conditional allocation flag can be cleared so as to convert that cache line into a fully allocated cache line.

However, at the time the processor changes from the higher exception level back to the lower exception level, then the process of FIG. 7B can be performed. In particular, when at step 310 the processor changes back to the lower exception level, this is treated as an allocation resolution event, and at step 315 any cache lines conditionally allocated into the cache that still have the conditional allocation flag set are invalidated. This will remove the prospect of the lower exception level code then seeking to perform a timing analysis in respect of the cache lines allocated when the processor was executing in the higher exception level. As an alternative to the approach shown in FIGS. 7A and 7B, the process could be arranged so that when moving from a given exception level to a higher privilege exception level, any conditionally allocated data is converted into unconditionally allocated data. As a result, the invalidation performed at step 315 in FIG. 7B when moving from a given exception level to a less privileged exception level will merely invalidate the data that was speculatively accessed at that given exception level.

Figure 8:
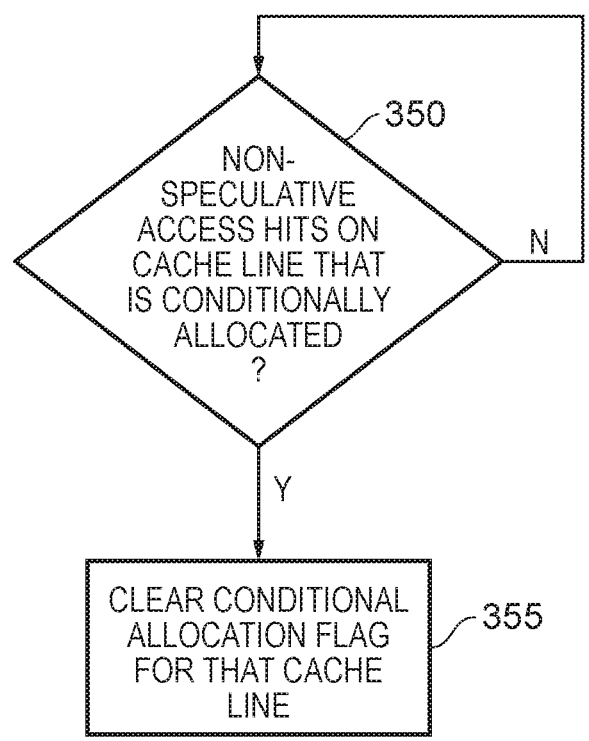
FIG. 8 is a flow diagram illustrating how a non-speculative access may be used as an allocation resolution event in respect of a cache line that has previously been conditionally allocated, in accordance with one example arrangement.

FIG. 8 is a flow diagram schematically illustrating how a non-speculative access may be treated as another type of allocation resolution event in respect of a specific cache line. In particular, at step 350, when a non-speculative access hits on a cache line that is conditionally allocated, the process proceeds to step 355 where the conditional allocation flag for that cache line is cleared, so as to convert that cache line into a fully allocated cache line.

Figure 9:
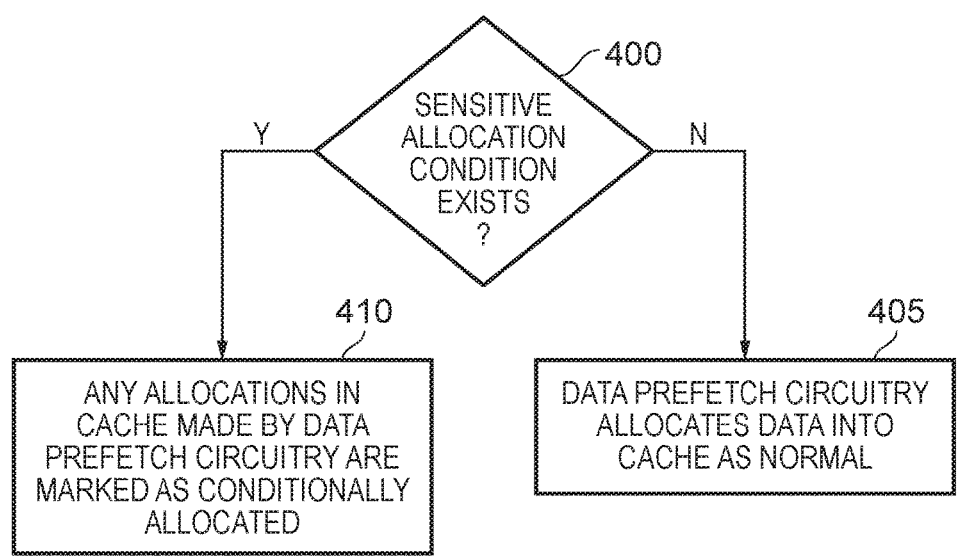
FIG. 9 illustrates how the operation of a data prefetching circuit may be altered depending on whether the sensitive allocation condition exists, in accordance with one example arrangement.

The above described behaviour of conditionally allocating cache lines can also be extended to the activities of any data prefetching circuitry that is seeking to prefetch from memory data in anticipation of it being required by the processing circuitry. In particular, when the sensitive allocation condition exists, the behaviour of the data prefetching circuitry can be altered as shown in FIG. 9. At step 400 it is determined whether the sensitive allocation condition exists, and if not the process proceeds to step 405 where the data prefetch circuitry prefetches data as normal, which may result in the data being allocated into the cache in the standard manner. However, if the sensitive allocation condition exists, then the process proceeds to step 410 where any allocations in the cache made as a result of the activities of the data prefetch circuitry are marked as conditionally allocated.

As per the mechanism described with reference to FIG. 8, once prefetched data has been conditionally allocated into the cache, if a genuine access request that is executed non-conditionally hits in that cache line, the data can be converted into an unconditionally allocated format by clearing the conditional allocation flag. Further, when an allocation resolution event occurs that is associated with the sensitive allocation condition, then the actions taken in respect of conditionally allocated prefetched data may be the same as taken for any other conditionally allocated data. Hence, dependent on the type of allocation event, the relevant cache lines containing prefetched data may be invalidated, or converted into fully allocated cache lines.

Whilst in FIG. 9 it is assumed that the prefetched data is only conditionally allocated if the sensitive allocation condition exists, in an alternative implementation the system may always treat prefetched data as being conditionally allocated in the first instance, and accordingly always set the conditional allocation flag when a cache line is allocated into the cache for data that is being prefetched by the prefetch circuitry.

FIGS. 10A to 10C illustrate another example scenario where conditional allocation of cache lines may take place. As shown in FIG. 10A, it is assumed that a first memory access instruction is in the process of being executed, but may abort, and at the time the second memory access instruction is executed it is not yet known whether the first memory access instruction will abort. The second memory access instruction only requires executing if the first memory access instruction does not abort. As a result, the second memory access instruction is being executed speculatively.

As shown in FIG. 10B, it is determined at step 450 whether the status of the first memory access is unknown at the time the second memory access is performed. If not, then usual processing is performed at step 455, and any cacheable data accessed by the second memory access instruction may be allocated into the cache in the normal way. However, if the status of the first memory access is unknown, then the process proceeds to step 460 where any data accessed by the second memory access instruction is conditionally allocated into the cache.

FIG. 10C illustrates the associated allocation resolution event. In particular, when it is determined that the status of the first memory access has been resolved at step 465, the process proceeds to step 470 where it is determined whether the first memory access was aborted or not. If not, the process proceeds to step 475 where the conditional allocation flag is cleared for the cache line associated with the second memory access. However, if the first memory access was aborted, the process proceeds to step 480 where the cache line associated with the second memory access is invalidated.

It will be appreciated that the above described techniques provide an improved mechanism for controlling allocation of data into a cache storage, which can provide some protection against certain types of cache timing analysis attack.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions;
a cache storage to store data accessed when executing the instructions; and
cache control circuitry arranged, whilst a sensitive allocation condition is determined to exist, to be responsive to the processing circuitry speculatively executing a memory access instruction that identifies data to be allocated into the cache storage, to allocate the data into the cache storage and to set a conditional allocation flag in association with the data allocated into the cache storage;
the cache control circuitry being responsive to detecting an allocation resolution event, to determine based on a type of the allocation resolution event whether to clear the conditional allocation flag such that the data is thereafter treated as unconditionally allocated, or to cause invalidation of the data in the cache storage,
wherein the sensitive allocation condition is determined to exist at least when a requirement to execute the memory access instruction is dependent on an outcome of a branch operation that is unresolved at a time the processing circuitry speculatively executes the memory access instruction.

2. An apparatus as claimed in claim 1, wherein the allocation resolution event occurs at least when the outcome of the branch operation is resolved.

3. An apparatus as claimed in claim 2, wherein when the outcome of the branch operation indicates that execution of the memory access instruction is required, the cache allocation circuitry is arranged to clear the conditional allocation flag associated with the data in the cache storage that was accessed by the speculative execution of the memory access instruction, and when the outcome of the branch instruction indicates that the memory access instruction is not to be executed, the cache allocation circuitry is arranged to cause invalidation of the data in the cache storage that was accessed by the speculative execution of the memory access instruction.

4. An apparatus as claimed in claim 1, wherein the branch operation is a range check operation to determine whether a memory address identifying the data to be accessed by the memory access instruction is within an allowable range of memory addresses, and the memory access instruction is to be executed when the memory address is within the allowable range.

5. An apparatus as claimed in claim 1, wherein the sensitive allocation condition is determined to exist at least when a speculation barrier instruction is encountered in a sequence of instructions, the speculation barrier instruction preventing the processing circuitry speculatively executing one or more types of instructions appearing after the speculation barrier instruction in the sequence during a barrier period, the barrier period ending when speculation is resolved in respect of any speculatively executed instructions appearing before the speculation barrier instruction in the sequence.

6. An apparatus as claimed in claim 5, wherein the memory access instruction is allowed to be speculatively executed during the barrier period, but with the data allocated into the cache storage having the conditional allocation flag set.

7. An apparatus as claimed in claim 6, wherein:
the allocation resolution event occurs at least when speculation is resolved in respect of any speculatively executed instructions appearing before the speculation barrier instruction in the sequence; and
when the resolution of the speculation indicates an incorrect speculation was made, the cache control circuitry is arranged to cause the conditionally allocated data to be invalidated in the cache storage.

8. An apparatus as claimed in claim 1, wherein the sensitive allocation condition is determined to exist at least when a state of the processing circuitry changes from a first state to a second state, in the second state the processing circuitry having access to data at one or more memory addresses not accessible when the processing circuitry is in the first state.

9. An apparatus as claimed in claim 8, wherein the allocation resolution event occurs at least when the state of the processing circuitry changes from the second state to the first state, the cache control circuitry being arranged, when the conditional allocation flag is still set when the state of the processing circuitry changes from the second state to the first state, to cause invalidation of the associated data within the cache storage.

10. An apparatus as claimed in claim 1, wherein the allocation resolution event occurs at least when a further memory access instruction executed non-speculatively causes access to data in the cache storage whose associated conditional allocation flag is set, the cache control circuitry being responsive to the access caused by execution of the further memory access instruction to clear the conditional allocation flag such that the data is thereafter treated as unconditionally allocated.

11. An apparatus as claimed in claim 1, further comprising:
data prefetch circuitry for performing data prefetch operations to preload data into the cache storage in anticipation of that data being required by the processing circuitry; and
the cache control circuitry is further arranged, at least whilst the sensitive allocation condition is determined to exist, to set the conditional allocation flag in association with preloaded data obtained by the data prefetch circuitry and allocated into the cache storage.

12. An apparatus as claimed in claim 1, wherein the sensitive allocation condition is determined to exist at least when a preceding memory access instruction is executed that may abort, and the memory access instruction that is speculatively executed by the processing circuitry is a memory access instruction that is not to be executed if the preceding memory access instruction aborts.

13. An apparatus as claimed in claim 1, wherein:
whilst the sensitive allocation condition exists, the processing circuitry is arranged to speculatively execute multiple memory access instructions, to cause data to be allocated into multiple entries of the cache storage with the associated conditional allocation flags set; and
when the allocation resolution event is a global allocation resolution event that applies equally to the data in each of the multiple entries, the cache control circuitry is arranged, dependent on the type of the global allocation resolution event, to either clear the conditional allocation flags for each of the multiple entries, or to cause invalidation of the data in each of the multiple entries.

14. An apparatus as claimed in claim 1, wherein the memory access instruction that is speculatively executed by the processing circuitry is a load instruction executed to load data from memory into at least one register accessible to the processing circuitry.

15. An apparatus as claimed in claim 1, wherein when the cache control circuitry causes the data to be invalidated and the data is marked as dirty, the cache control circuitry will cause the data to be evicted from the cache storage prior to the associated entry in the cache being marked as invalid.

16. An apparatus as claimed in claim 1, wherein the allocation resolution event occurs at least when an associated sensitive allocation event giving rise to the sensitive allocation condition has been resolved.

17. An apparatus as claimed in claim 16, wherein:
the cache storage comprises a plurality of cache lines, and the cache control circuitry is arranged to mark a cache line as a conditionally allocated cache line when allocating data into that cache line whilst the sensitive allocation condition exists;
multiple sensitive allocation events may occur before the associated allocation resolution events occur; and
the apparatus further comprises a tracking storage referenced by the cache control circuitry to identify, for each awaited allocation resolution event, which conditionally allocated cache lines are associated with that allocation resolution event.

18. A method of controlling allocation of data into cache storage used to store data for access by processing circuitry when executing instructions, comprising:
whilst a sensitive allocation condition is determined to exist, responding to the processing circuitry speculatively executing a memory access instruction that identifies data to be allocated into the cache storage, by allocating the data into the cache storage and setting a conditional allocation flag in association with the data allocated into the cache storage; and
on detecting an allocation resolution event, determining based on a type of the allocation resolution event whether to clear the conditional allocation flag such that the data is thereafter treated as unconditionally allocated, or to cause invalidation of the data in the cache storage,
wherein the sensitive allocation condition is determined to exist at least when a requirement to execute the memory access instruction is dependent on an outcome of a branch operation that is unresolved at a time the processing circuitry speculatively executes the memory access instruction.

19. An apparatus comprising:
processing means for executing instructions;
cache storage means for storing data accessed when executing the instructions; and
cache control means, whilst a sensitive allocation condition is determined to exist, for responding to the processing means speculatively executing a memory access instruction that identifies data to be allocated into the cache storage means, by allocating the data into the cache storage means and setting a conditional allocation flag in association with the data allocated into the cache storage means;
the cache control means for responding to detection of an allocation resolution event, by determining based on a type of the allocation resolution event whether to clear the conditional allocation flag such that the data is thereafter treated as unconditionally allocated, or to cause invalidation of the data in the cache storage means, wherein the sensitive allocation condition is determined to exist at least when a requirement to execute the memory access instruction is dependent on an outcome of a branch operation that is unresolved at a time the processing means speculatively executes the memory access instruction.

\* \* \* \* \*